(12) United States Patent
Eggleton et al.

(10) Patent No.: US 6,370,300 B1
(45) Date of Patent: Apr. 9, 2002

(54) OPTICAL COMMUNICATION SYSTEM INCORPORATING AUTOMATIC DISPERSION COMPENSATION MODULES

(75) Inventors: Benjamin John Eggleton, Summit; Torben N. Nielsen, Monmouth Beach; John A. Rogers, New Providence; Thomas Andrew Strasser, Warren; Kenneth Lee Walker, New Providence, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/252,708

(22) Filed: Feb. 18, 1999

(51) Int. Cl.$^7$ ................................................. G02B 6/34
(52) U.S. Cl. ......................................... 385/37; 359/161
(58) Field of Search .............................. 359/161; 385/37

(56) References Cited

U.S. PATENT DOCUMENTS

| | | | | |
|---|---|---|---|---|
| 5,943,151 A | * | 8/1999 | Grasso et al. ................ | 359/161 |
| 5,982,963 A | * | 11/1999 | Feng et al. .................... | 385/37 |
| 6,078,418 A | * | 6/2000 | Hansen et al. ............... | 359/161 |

OTHER PUBLICATIONS

Sun et al. "Tunable compensation of dispersion induced RF power degradation in multiple–channel SCM transmission by nonlinearly–chirped FBGs", CLEO'99, p. 316–317, May 1999.*

Cai et al. "Dynamic dispersion compensation in a 10–Gbit/s optical systems using a novel nonlinearly chirped fiber Bragg grating", Technical Digest, p. 365–367, May 1999.*

* cited by examiner

Primary Examiner—Ellen E. Kim
(74) Attorney, Agent, or Firm—Lowenstein Sandler PC

(57) ABSTRACT

In accordance with the invention, an optical communication system is provided with one or more automatic dispersion compensation modules. Each module has an adjustable dispersion element, a data integrity monitor and a feedback network whereby the monitor adjusts the dispersion element to optimize system performance. In a preferred embodiment the dispersion compensating modules comprise chirped fiber Bragg gratings in which the chirp is induced in the grating by passing a current along distributed thin film heaters deposited along the length of the fiber. The magnitude of the applied current determines the dispersion of the grating. A data integrity monitor is configured to sense the integrity of transmitted data and to provide electrical feedback for controlling the current applied to the grating.

12 Claims, 9 Drawing Sheets

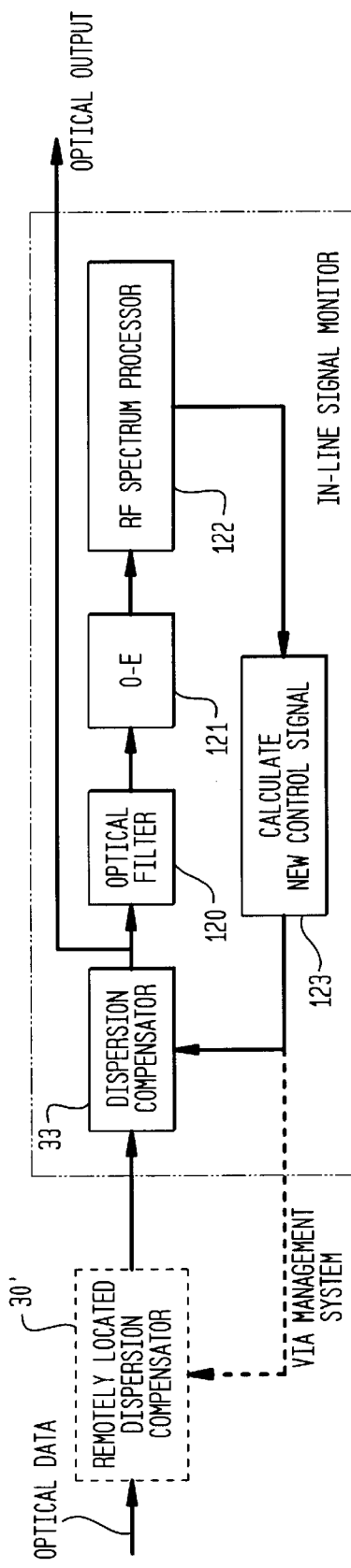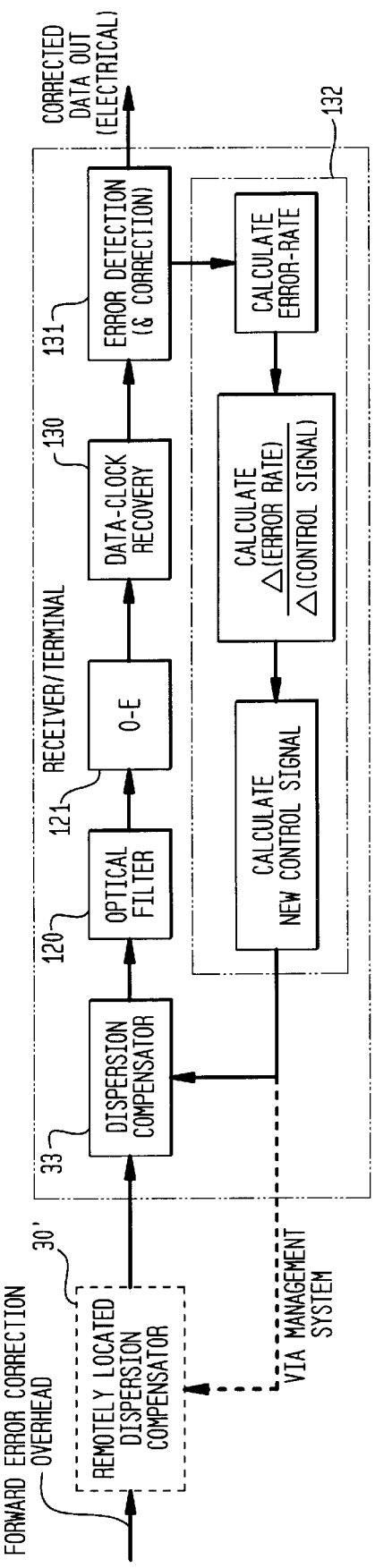

OPTICAL COMMUNICATION SYSTEM INCORPORATING AUTOMATIC DISPERSION COMPENSATION MODULES

FIELD OF INVENTION

The present invention relates to optical communication systems and, in particular, to an optical communication system incorporating one or more automatic chromatic dispersion compensation modules for optimizing system performance.

BACKGROUND OF INVENTION

Optical fiber communication systems are beginning to achieve their great potential for the rapid transmission of vast amounts of information. In essence, optical fiber system comprises a source of information-carrying optical signals, an optical fiber transmission line for carrying the optical signals and a receiver for detecting the optical signals and demodulating the information they carry. Optical amplifiers are typically located along the line at regular intervals, and add/drop nodes are disposed at suitable locations for adding and dropping signal channels.

Optical communication systems are usually based on high purity silica optical fiber as the transmission medium. Conventional systems are typically designed to transmit optical signals in a wavelength range where longer wavelength components are subject to slightly longer propagation time delay than shorter wavelengths. This chromatic dispersion did not deteriorate the information content of the optical signals because early systems used a single channel at a wavelength where dispersion is low.

As it has become desirable to utilize many channels over a wider range of optical wavelengths (WDM systems), group velocity dispersion has required more precise compensation. WDM systems are becoming increasingly important for their ability to transmit vast amounts of information and for their ability to incorporate network functions such as add/drop and cross connecting. But as the number of channels increases in WDM systems, dispersion compensation becomes increasingly important.

Dispersion gives rise to undesirable pulse distortion, which can limit bandwidth and/or transmission distances. Dispersion compensation is thus critical to the performance and ultimate commercial success of communication systems and particularly of those that operate at 10 Gbit/s per wavelength channel and higher. Typically, dispersion compensation is accomplished using especially designed optical fibers possessing specified dispersions or with chirped fiber gratings, both of which work by providing a fixed amount of dispersion of an equal sign and opposite magnitude to that of a given fiber span. Both of these technologies have been demonstrated and are being incorporated into lightwave systems.

The performance of high speed WDM lightwave networks will depend critically on the details of the system design and particularly on the level of in-line dispersion and dispersion slope compensation as well as nonlinear effects occurring in the dispersion compensating fiber (DCF). In such systems small variations in optical power, due for example to imperfect gain flattening of optical amplifiers, can result in additional nonlinear phase shifts that can modify the optimal dispersion map of the system. This problem is exacerbated by a reduced dispersion budget associated with imperfect dispersion slope compensation over a wide bandwidth of operation. For example, in a typical system operating with approximately 40 nm of bandwidth, and with an uncompensated dispersion slope of 0.05 ps/nm² km, the accumulated divergence in the dispersion (assuming approximately 60% compensation in DCF) is approximately 1.2 ps/nm km. The corresponding dispersion budget is typically taken as twice this value, giving 2.4 ps/nm km. It follows that the maximum transmission distance (L) that can be achieved before incurring a significant penalty is given by $$L < 104{,}000/(B^2|D|)(\text{Gb/s})^2\text{ps/nm} \tag{1}$$

where B is the channel rate and D the dispersion of the fiber, is 32 km for a 40 Gbit/s system and 512 km for a 10 Gbit/s system. Therefore, in systems that operate at 10 Gbit/s, 40 Gbit/s or higher, the combination of dynamic fluctuations in the optical power and the reduced dispersion budget associated with the dispersion slope will impose significant challenges in designing networks.

Because of these variations with wavelength and level fluctuations, it is very difficult, with fixed or static dispersion compensating devices, such as DCF or conventional chirped Bragg gratings, to manage effectively the unavoidable dispersion and nonlinearities in a high speed WDM lightwave network. Optical networks typically have slow variations in the optimal path dispersion that arise whenever there is a change in the total optical power and/or power distribution in the network.

FIG. 1 shows an exemplary conventional optical fiber transmission system. The system comprises a transmitter 10, a transmission fiber path 11 and a receiver 12. The system may also include one or more static dispersion compensation modules 14. The transmission path typically comprises conventional optical transmission fiber, and optionally comprises one or more optical amplifiers 13 (typically erbium amplifiers). At the transmitter output the pulse shape is sharp and well defined. After passage through, typically hundreds of kilometers of optical fiber 11, including a multiplicity of optical amplifiers 13, the pulse has broadened, and is considerably distorted. After transmission through a (static) dispersion compensation module 14 the pulse is reshaped and is mostly restored into its original shape.

In realistic optical systems, significant nonlinearities occur in the transmission fiber and in other components of the network. These nonlinearities prevent complete dispersion compensation with a static module. With a fixed dispersion compensating element, optimization is difficult because nonlinearities give rise to additional phase shift and pulse distortion that are dependent on optical power and therefore change with time as the traffic on the network changes or the gain of the erbium-doped amplifiers change. It can therefore be very difficult to ensure complete restoration of the pulse at all points and at times in any realistic high-bit optical network. This results in pulse distortion that is not compensated for, can accumulate and can significantly degrade system performance.

In addition, in optical systems comprising more than one channel (Wavelength Division Multiplexed systems) the incurred pulse distortion can be channel dependent and, as before, can vary with time. In such a system, one requires the ability to add or to drop specific channels at selected nodes in the network. This adding and dropping can be accomplished, for example, with fiber gratings that reflect the desired channel and transmit all other channels. In performing add/dropping, the average power in the fiber can fluctuate. Gain flatteners are capable of accommodating for such changes, but small fluctuations in the optical power are unavoidable. As a consequence of this power fluctuation, the pulse can undergo more pulse distortion in the transmission fiber and thus can require a different and time-varying amount of dispersion compensation.

Several approaches to eliminate the effects of unwanted dispersion have been proposed: (a) optical pulse regeneration (b) optical phase conjunction (OPC); (c) optical solitons. All of these techniques are promising and have been demonstrated in laboratory environments, but they have important limitations for application to realistic systems such as those being deployed now. For example, OPC (also referred to as mid-span spectral inversion) requires that the dispersion compensation must be performed at the mid-point of the link. This requirement is often not possible to satisfy with many optical network designs. Soliton systems are very attractive, but they require precise management of the dispersion map of the system and suffer other disadvantages.

The use of dynamic dispersion elements in communication systems has been proposed to compensate for a change in the fiber dispersion resulting from a network reconfiguration (see J. X. Cai et al., Proceedings of Optical Fiber Conference, 1998, page 365 (1998)). The reference proposes the use of a dispersion monitor and a dynamic dispersion element to compensate for transmission pathlength changes. The monitor measures the total chromatic dispersion between the transmitter and the receiver. However, this approach measures only the dispersion and cannot directly measure the integrity of transmitted data. This is a critical flaw because the data is also distorted during transmission through nonlinear effects, where accumulated phase shifts not measured by a dispersion monitor, vary the dispersion compensation required to achieve optimum performance. Thus there is a need for an improved automatic dispersion compensation module to optimize system performance.

SUMMARY OF INVENTION

In accordance with the invention, an optical communication system is provided with one or more automatic dispersion compensation modules. Each module has an adjustable dispersion element, a data integrity monitor and a feedback network whereby the monitor adjusts the dispersion element to optimize system performance. In a preferred embodiment the dispersion compensating modules comprise chirped fiber Bragg gratings in which the chirp is induced in the grating by passing a current along distributed thin film heaters deposited along the length of the fiber. The magnitude of the applied current determines the dispersion of the grating. A data integrity monitor is configured to sense the integrity of transmitted data and to provide electrical feedback for controlling the current applied to the grating.

BRIEF DESCRIPTION OF THE DRAWINGS

The nature, advantages and various additional features of the invention will appear more fully upon consideration of the illustrative embodiments now to be described in connection with the accompanying drawings. In the drawings:

FIGS. 11–13 schematically depict exemplary data integrity monitors for use in the module of FIG. 2.

It is to be understood that these drawings are for purposes of illustrating the concepts of the invention and, except for the graphs, are not to scale.

DETAILED DESCRIPTION

This description is divided into three parts. Part I describes an optical communication system employing an automatic dispersion compensating module. Part II describes exemplary adjustable dispersion compensating gratings for the module, and Part III describes exemplary data integrity monitors for the module.

I. Communication System With Automatic Dispersion Compensation Module

Figure 1:
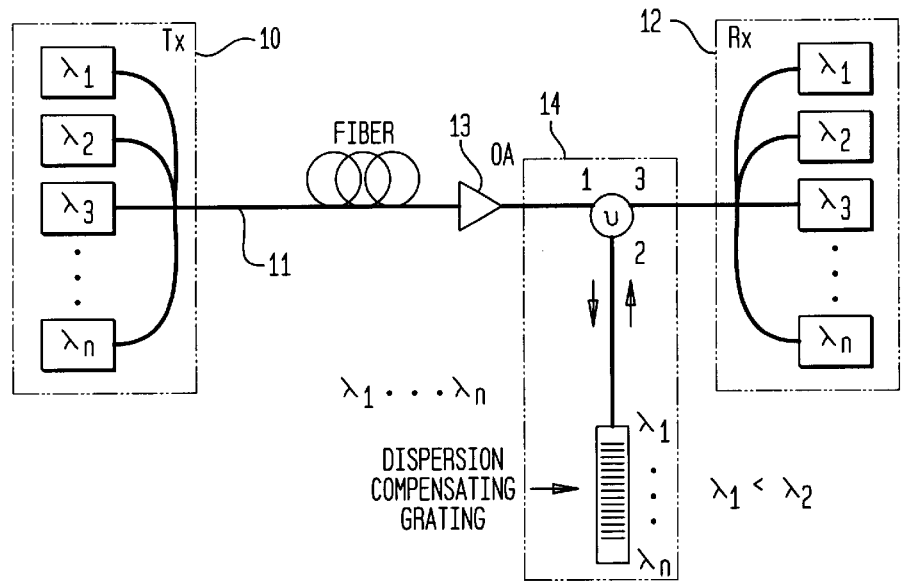
FIG. 1 schematically depicts a conventional optical fiber communication system using static dispersion compensation modules.
Figure 2:
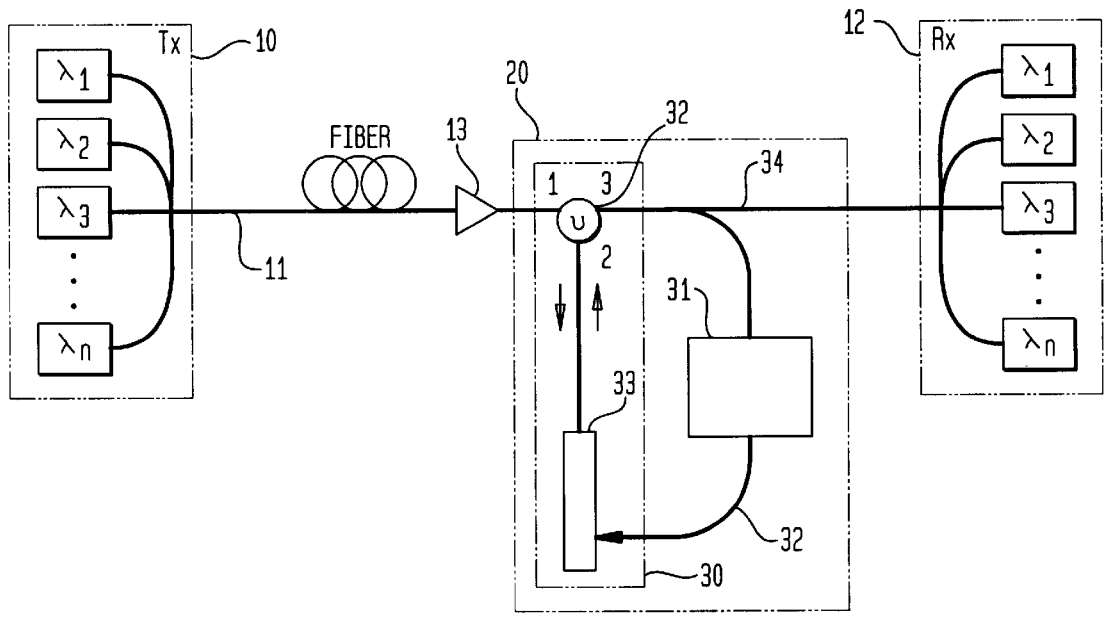
FIG. 2 schematically depicts an optical fiber communication system comprising one or more automatic dispersion compensation modules according to the invention.

Referring to the drawings, FIG. 2 shows schematically an exemplary optical communication system including one or more automatic dispersion compensation modules 20 according to the invention. The system is similar to that in FIG. 1 except for the addition of the automatic dispersion compensation module 20. The module can supplement or replace one or more static compensation modules (14 of FIG. 1) in order to optimize system performance.

Each automatic dispersion compensation module 20 comprises an adjustable dispersion compensator 30, a data integrity monitor 31 and a feedback network 32 whereby the monitor 31 adjusts the dispersion compensator 30 to optimize system performance. In this exemplary module, the adjustable dispersion compensator 30 comprises an optical circulator 32 coupled to the transmission fiber and an adjustable dispersion compensating grating (DCG) 33. The monitor 31 can comprise an optical receiver coupled to the transmission line and a data processor for deriving a feedback control signal from the received signal.

In operation, a portion of the signal on the transmission fiber 11 is sampled as by tap 34. The signal is analyzed to provide a measure of the integrity of transmitted data, and the measure controls a feedback signal to control the adjustable DCG 33. If redundant coded data is transmitted, the analysis can be as simple as a threshold level chosen to be highly sensitive to errors in the system. Feedback is chosen to minimize the error rate. The redundant coding can be error detection signals already used in optical transmission such as the bit-interleaved parity 8 error detection codes in the B-octets of the Sonet protocol.

In the adjustable dispersion compensator 30, signal light from the transmission fiber 11 enters one port of the circulator 32 and is directed to an adjustable DCG 33 at a second port. The adjustable DCG 33 in this example is an adjustable Bragg grating operating in reflection mode. The compensated signal light is reflected back to the circulator 32 from which it is directed to a subsequent segment of the transmission fiber 11.

The adjustable DCG 33 can be any one of a variety of adjustable dispersion grating devices including gratings having chirp adjustable by tapered resistive heaters, by tapered strain relief, or by magnetically adjustable strain. Resistive heater adjustable dispersion grating devices are described in Eggleton et al., U.S. patent application Ser. No. 08/183,048 entitled "Optical Grating Devices With Adjustable Chirp" filed Oct. 30, 1998, now U.S. Pat. No. 5,487,436. Magnetically adjustable devices are described in S. Jin et al., U.S. application Ser. No. 09/159,178 entitled "Tunable Dispersion Compensator and Optical System Comprising Same filed Sep. 23, 1998, now U.S. Pat. No. 6,148,127, both of which are incorporated herein by reference.

The data integrity monitor 31 can be any one of several types of monitors capable of sensing the level of system performance in maintaining the quality of transmitted data.

Such performance can be sensed indirectly, as by analysis of the transmitted spectrum, or directly as by analysis of error rates.

II. Adjustable Dispersion Compensating Gratings

Figure 3:
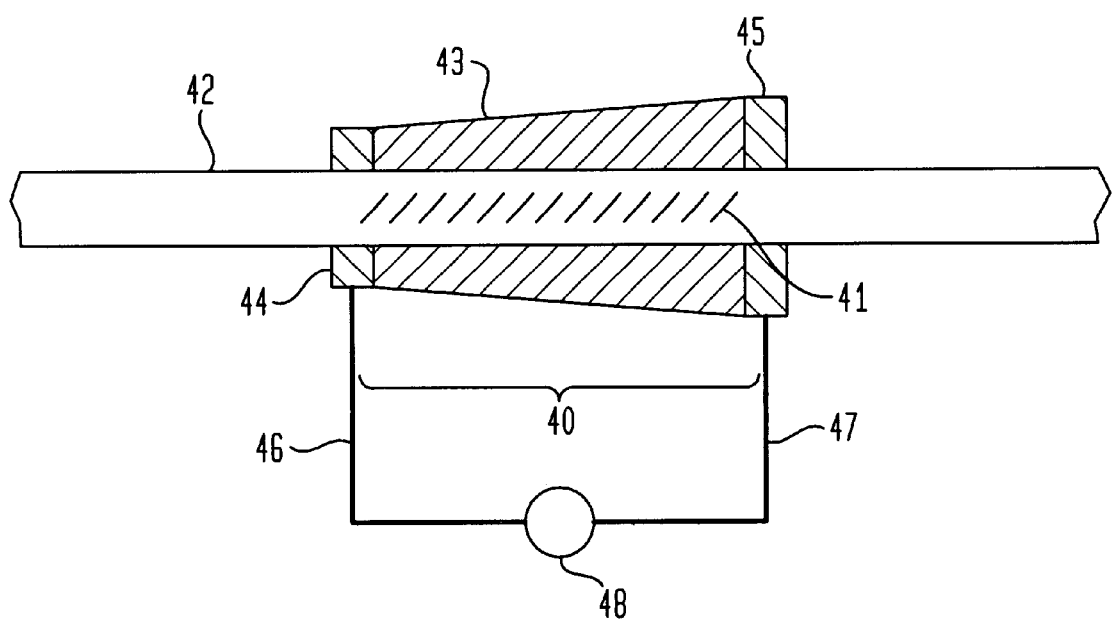
FIG. 3 shows an exemplary adjustable dispersion compensating element for use in the module of FIG. 2.

FIG. 3 illustrates an exemplary adjustable DCG 33 useful in the embodiment of FIG. 2. The grating 40 comprises a sequence of index perturbations 41 in a fiber 42 spaced to form an apodized Bragg grating. The grating 40 is disposed in thermal contact with an electrically controllable heat-transducing body 43, which can be a heat-generating body or a body which actively removes heat. The body 43 is typically a heat-generating body such as a resistive film on the fiber. The body 43 can linearly vary in resistance along the grating 40 to provide linearly varying heating of the grating and thus produce a linear chirp. This variation in resistance can be achieved, for example, by varying the thickness of the body 43 along the grating. A pair of electrodes 44, 45 provides electrical contact with wires 46, 47 from an electrical source 48, such as a source contained in the monitor feedback circuit. Advantageously, the grating 40 is enclosed in a cylindrical tube about 1 cm in diameter for thermal isolation. The structure, fabrication and operation of such thermally adjustable grating is described in greater detail in Eggleton et al, U.S. patent application 08/183,048, filed Oct. 30, 1998, now U.S. Pat. No. 5,487, 436, and entitled *Optical Grating Devices With Adjustable Chirp* which is incorporated herein by reference.

The following is a specific example of the design and analysis of a specific adjustable grating 40.

EXAMPLE

We present detailed results on a fiber grating device that provides constant dispersion over its bandwidth and that can be dynamically adjusted by varying an applied voltage. This device relies on a linear temperature gradient induced along the length of the grating by resistive heating in a metal coating whose thickness varies inversely with position along the length of the fiber. The chirp rate, and thus the dispersion, is controlled by varying the applied current. Numerical modeling and experimental evidence confirms that, to a very good approximation, the temperature varies linearly along the length of the grating and the resulting chirp is linear. We demonstrate experimentally continuous tuning of the dispersion from 300 ps/nm to 1350 ps/nm, with less than 1 W of electrical power. Measurements of the grating dispersion characteristics reveal a group delay ripple with an average deviation from linearity of approximately 10 ps, indicating that the device would be well suited to operation in 10 Gbit/s lightwave systems. In the following we describe the principle of operation of this device, present a simple model for prescribing the chirp as well as more detailed numerical simulations of heat flow through such structures, and finally summarize some optical measurements of the devices.

The device consists of an unchirped, apodized fiber Bragg grating that is coated with a thin film of metal whose thickness varies along the length of the grating. Current flowing through the film generates local resistive heating in a manner that is determined by the thickness of the film. Control over the film thickness, therefore, allows considerable control over the temperature profile and, in turn, the chirp of the grating. If we assume, for simplicity, that (i) the temperature distribution in the core of the fiber follows the distribution of heating power produced by the resistive film (i.e. the flow of heat along the length of the fiber does not seem to cause the shape of the temperature distribution to deviate strongly from the distribution of heating), (ii) the increase in temperature is linearly related to the heating power (i.e. the flow of heat out of the fiber is approximately linear even though radiation and convection are strictly non-linear processes), and (iii) shifts in the Bragg resonance are linearly related to changes in temperature, then it is possible to derive a simple expression that relates the chirp to the thickness profile. We first use of the fact that the local resistance, $R(z)$, is inversely proportional to the thickness, $t(z)$:

$$R(z) \sim 1/t(z) \qquad (2)$$

where z is the position along the grating. Given that the local power dissipated is given by, $$P(z) = I^2 R(z), \qquad (3)$$

and that the local temperature change is proportional to the power dissipated then we can write, $$\Delta \lambda_B(z) \sim \Delta T(z) \sim I^2/t(z) \qquad (4)$$

where $\Delta \lambda_B(z)$ is the local shift in the Bragg wavelength, $\Delta T(z)$ is the change in temperature, and I is the applied current. This equation represents a simple, approximate description of the behavior of these devices, and provides guidance for engineering tunable grating devices and the associated dispersion. For example, if we assume a thickness that varies inversely with distance along the length of the grating (i.e. $t(z) \sim 1/z$) then $\Delta \lambda(z) \sim z$ corresponding to a grating in which the Bragg wavelength varies linear along its length. To a good approximation the dispersion of the grating is given by $D = d\Delta \tau/d\Delta \lambda$, where $\Delta \tau = 2nL/c$ is the round trip time of the grating, n is the refractive index of the fiber, L is the length of the grating and c is the speed of the light in vacuum, and $\Delta \lambda$ is the grating's bandwidth. Thus, using Eq. (4), and assuming the $t(z) \sim 1/z$ film profile, it is straightforward to show that the dispersion of the grating scales with the inverse square of the applied voltage or current, i.e. $D \sim 1/V^2 \sim 1/I^2$.

To treat the general case, without simplifying assumptions, we used non-linear finite element modeling to compute the steady state thermal distributions in operating devices with geometries like those described above. We assumed cylindrical symmetry, and solved the equation for thermal diffusion:

$$\nabla \cdot (\kappa(r) \nabla (T(r,z))) = 0 \qquad (5)$$

where $T(r,z)$ is the temperature and $\kappa(r)$ is the thermal conductivity. The calculations were performed for a two-material structure consisting of a glass fiber (diameter=120 $\mu$m) coated with a tapered film of silver. Perfect thermal contact between the silver and the glass was assumed and continuity of normal heat flux normal was enforced at the boundary between the two materials. The calculations used adaptive mesh refinement and radiative and convective heat loss from the surface of the silver at rates given by $\sigma E(T^4 - T_o^4)$, and $A(T-T_o)^{5/4}$ respectively, where T is the temperature of the surface of the metal, $T_o$ is the temperature of the surroundings, $\sigma$ is the Stefan-Boltzmann constant, E is the emissivity of the surface of the metal, and A is a constant that characterizes natural convection in air. The thickness of the metal coating varied between 5 and 20 microns and the size of simulated system along the length of the fiber was chosen large enough for the temperature distribution in the coated region to be insensitive to the boundary conditions at the ends of the fiber (temperature fixed to that of the surroundings).

Figure 4A:
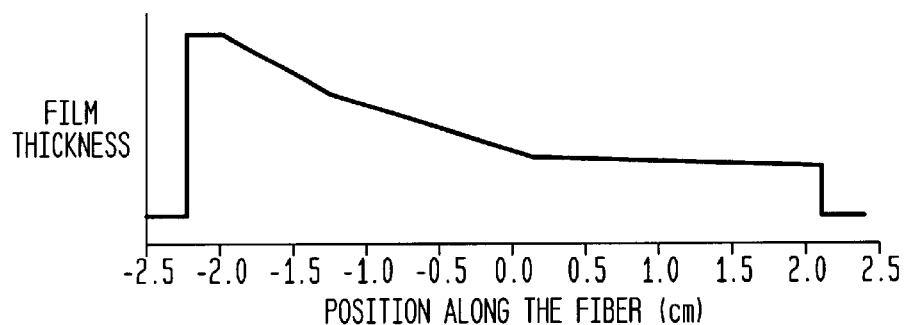
FIGS. 4(a)–(d), 5(a)–(b), 6(a)–(b), and 7–10 are graphical illustrations useful in understanding the operation of the adjustable dispersion compensating element of FIG. 3.
Figure 4B:
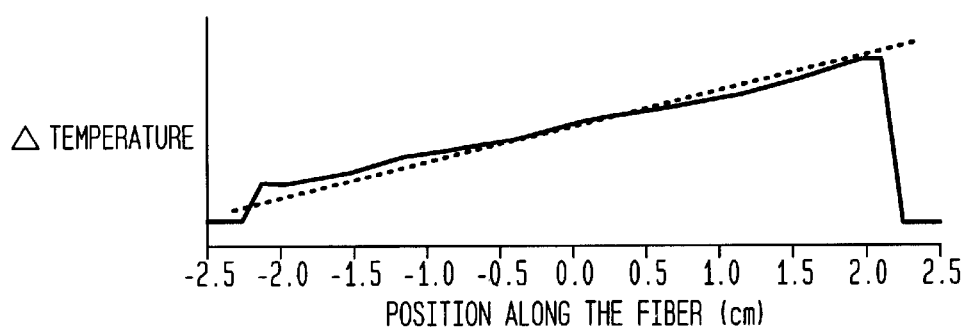
Figure 4C:
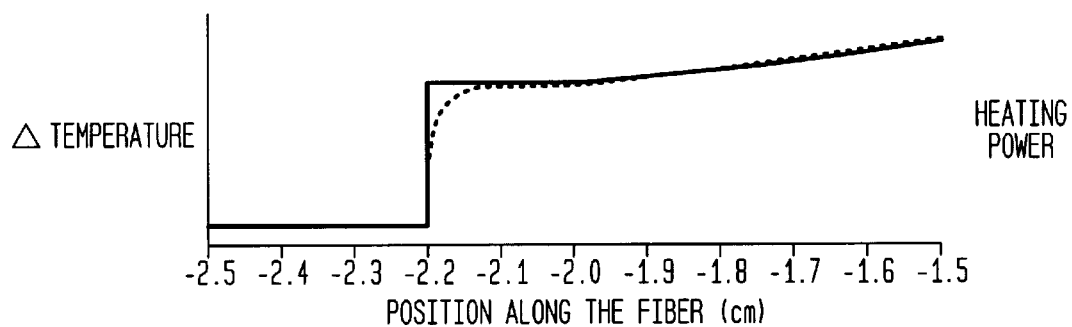
Figure 4D:
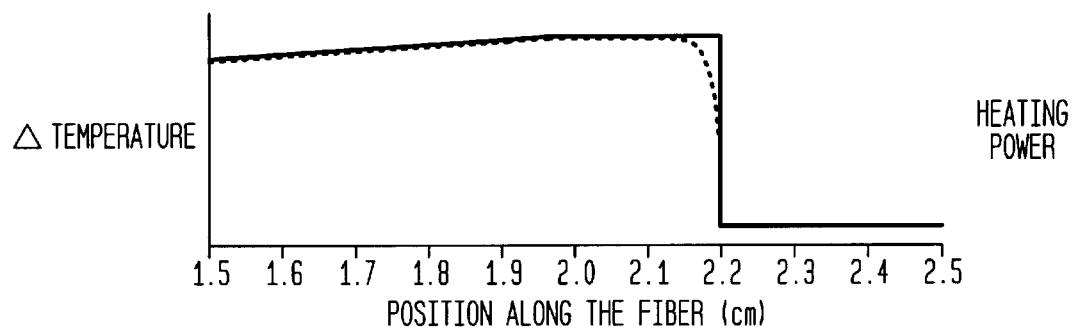

FIGS. 4a–4d are useful in understanding the heating of the grating. FIG. 4a illustrates a device with a film whose thickness is approximately inversely proportional to distance along the fiber. (For the purposes of simulation, we divided the coating into three linear segments to approximate a continuous coating whose thickness depends inversely on position.) FIG. 4b shows the computed temperature at the core of the device. The results for this particular system indicate that the simplifying assumptions described in the previous paragraph are valid at locations away from the ends of the coating (i.e. equation (4) is applicable at these locations). The dependence of the temperature on position at the ends of the coating provides a rough measure for the limits of validity of assumption (i) outlined in the previous paragraph. (See FIGS. 4(c) and 4(d). It reveals the extent to which thermal diffusion along the length of the fiber "smears out" the temperature distribution expected based solely on the geometry of the thin film heater. As FIGS. 4c and 4d show, for this system, the effective axial thermal diffusion length is ~1 mm. This length is, however, a sensitive function of the precise rate of thermal transport out of and along the structure; direct experimental measurements will be required to obtain an accurate estimate of this quantity.

Measurements were performed on devices that used gratings that were 8 cm in total length. The gratings were suitably apodized to reduce interference effects due to the sharp boundaries that are present in at the ends of uniform Bragg gratings. They were fabricated in standard telecommunications fiber (containing germanium) which was appropriately hydrogenated.

Figure 5A:
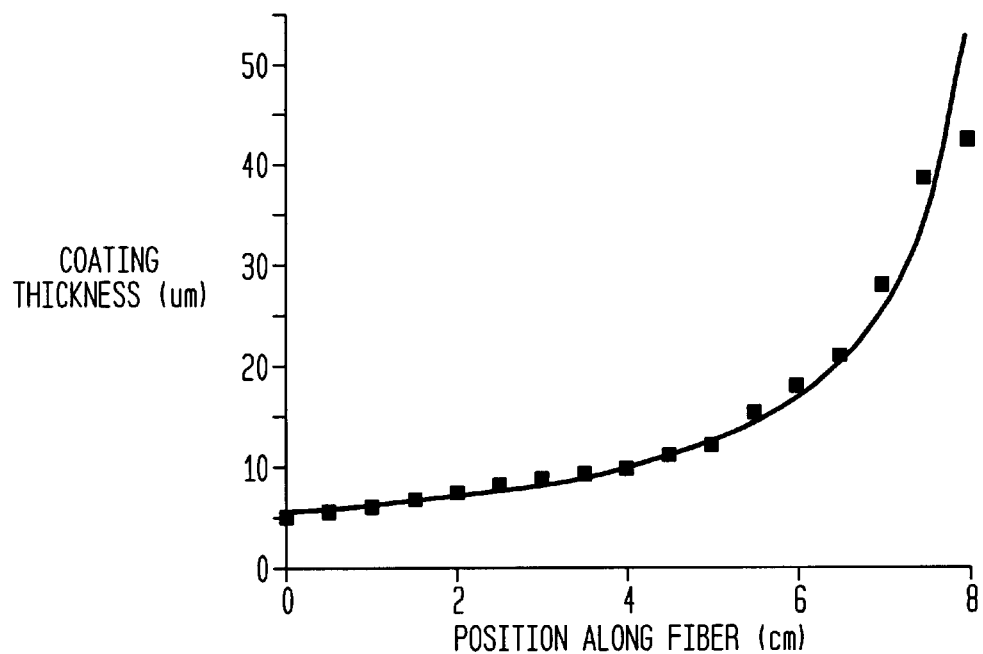
Figure 5B:
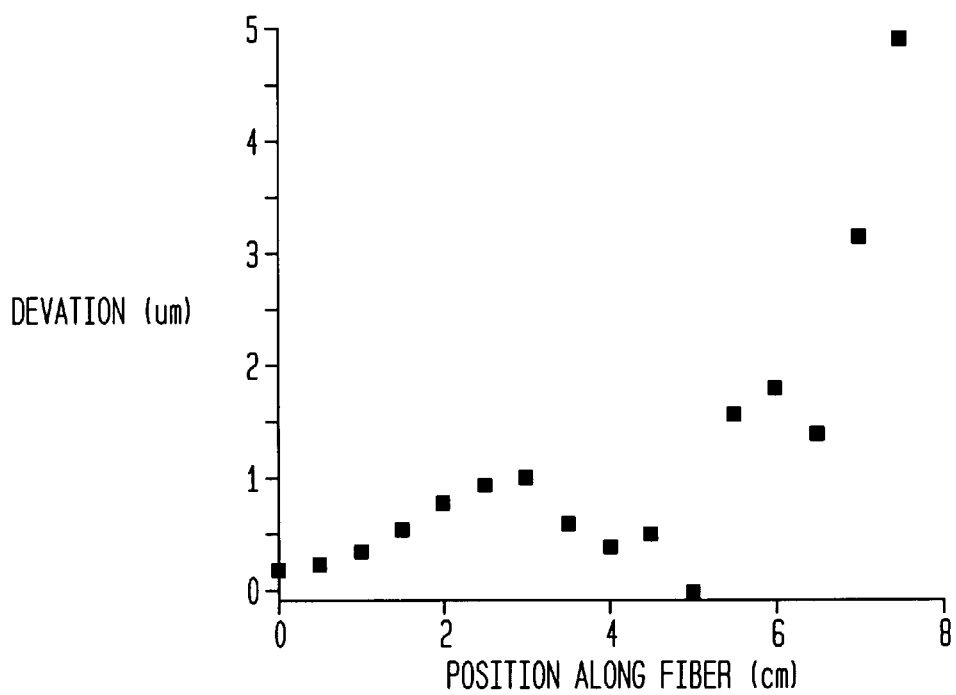

FIG. 5(a) shows optical measurements of the thickness of the film along the length of the fiber grating. For this particular sample, the thickness of the metal film varies from approximately 5 $\mu$m to 50 $\mu$m. The solid line is the target profile, which varies inversely with distance along the length of the fiber, and was designed to achieve a desired temperature excursion between the ends of the grating, for a prescribed current. The uncertainty in the measurement of the film thickness is of the order of 1 $\mu$m. FIG. 5(b) shows the deviation of the film thickness from the solid line shown in FIG. 5(a). For most of the length along the fiber grating, the deviation is comparable to the measurement uncertainty (1 $\mu$m) and exceeds this value only near the end of the grating.

Figure 6A:
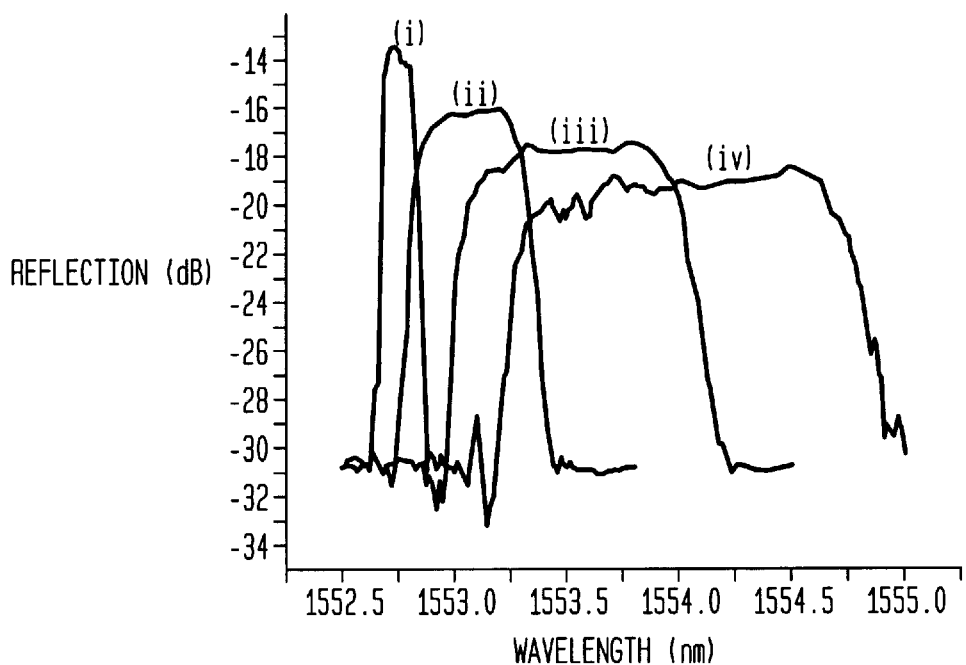
Figure 6B:
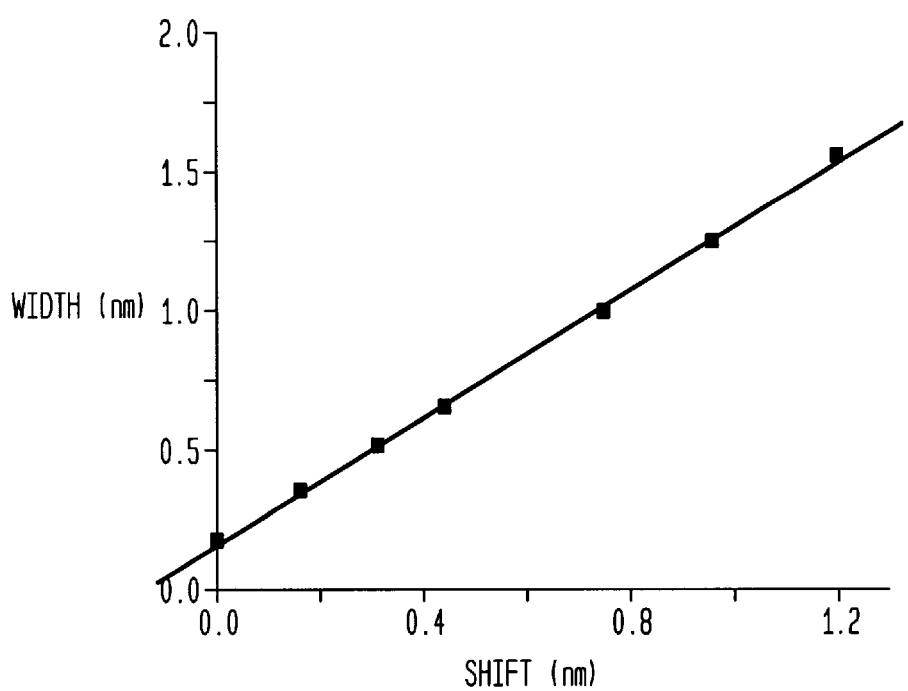

FIG. 6(a) shows typical measured reflection spectra of the fiber grating device for increasing values of applied voltage: (i) 0V, corresponding to the grating in its unchirped state; (ii) 0.611V; (iii) 0.82V and (iii) 1.1V. The uniform broadening in the reflection spectrum arises from heating that varies monotonically and approximately linearly along the length of the grating. Note that there is also an overall shift in the center of the reflection peak that accompanies the broadening. FIG. 6(b) shows the change in the width of the reflection peak as a function of the shift in the center wavelength of the reflection peak; the linearity of this data is consistent with the linear temperature dependence of the device. In general, the shift is undesirable and thus would need to be compensated by mechanical strain or an additional source or sink of heat.

Figure 7:
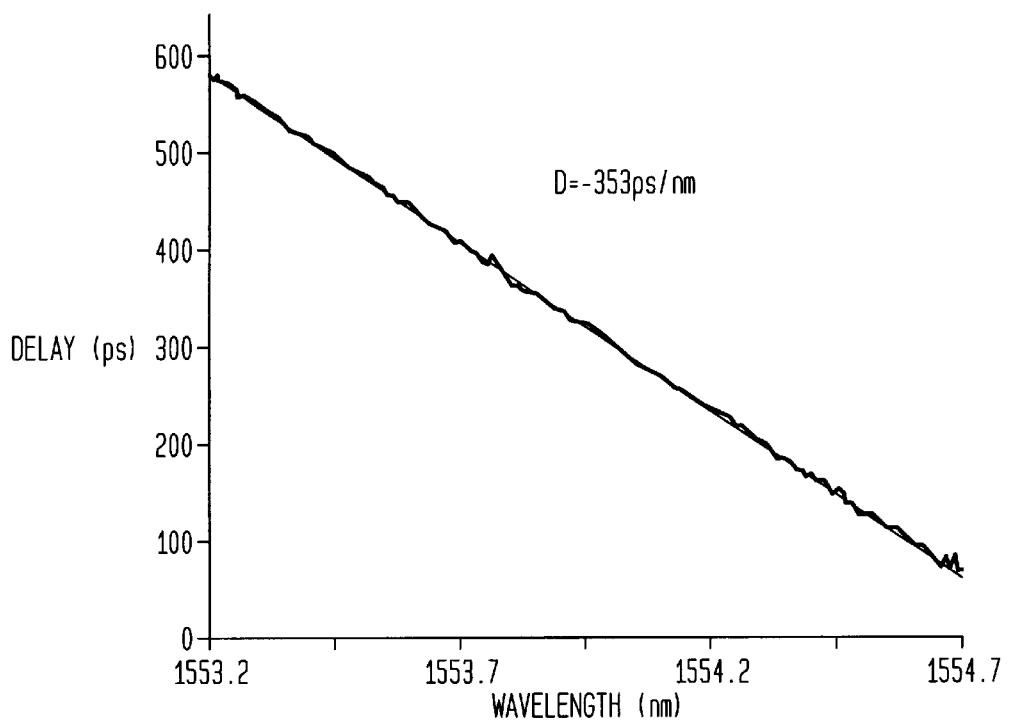
Figure 8:
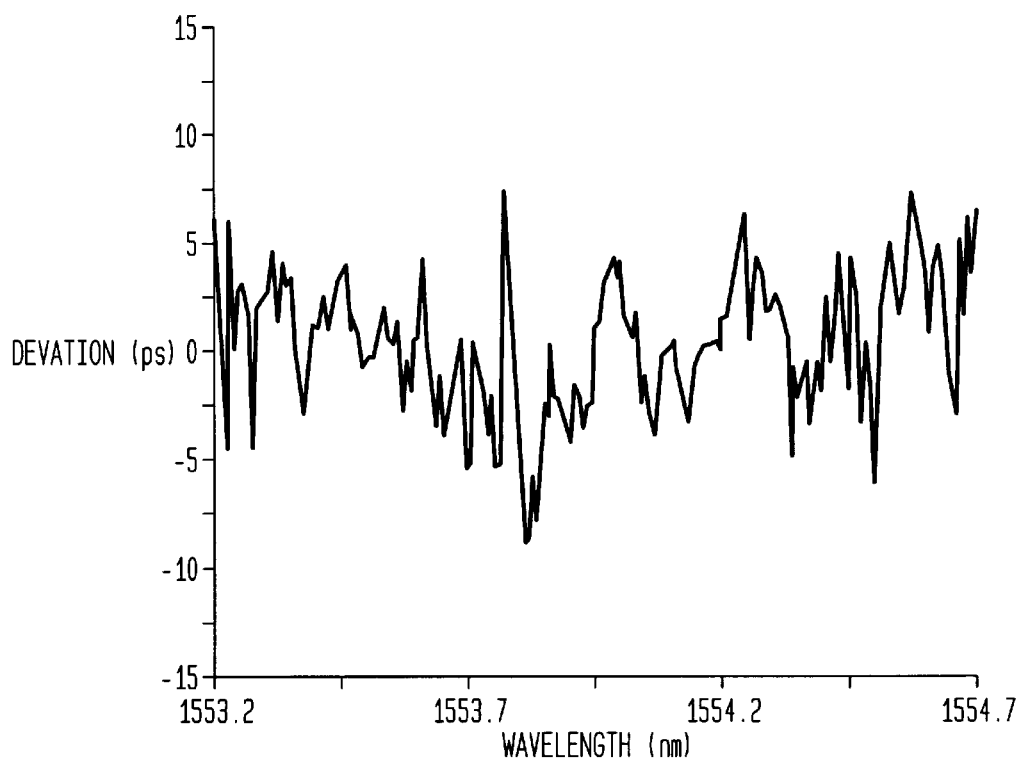

FIGS. 7–10 illustrate the dispersive properties of the device. FIG. 7 shows the measured group delay of the device versus wavelength for an applied voltage of 1 V. The dashed line shows a linear fit to the data and has a slope of D=−353 ps/nm. Note that there is small structure in the group delay, shown clearly in FIG. 8, which shows the deviation in the measured group delay from linearity. The peak-to-peak fluctuation is less than 10 ps. The resolution of this measurement was 0.005 nm and thus it is unlikely that any structure exists on a finer scale. This structure, which is typical in chirped Bragg gratings similar in magnitude to the best results reported elsewhere and provides a measure of the quality of the gratings and of the applied chirp.

The possible causes for the structure in the group are as follows: (a) imperfections in the grating fabrication process that can result in noise in the local effective index in the grating profile; (b) fluctuations in the fiber core diameter, which can give rise to small variations in the effective index of core mode and thus provide additional "noise" in the grating profile; (c) non-ideal apodization, which can result in undesired interference effects in the grating, although this would appear as systematic ripple and thus is probably insignificant; and (d) deviations in the film thickness profile from the desired one, or nonuniformities in the resistivity or surface texture that give rise to undesired variations in temperature. Although it is difficult at this point to determine definitively the dominant cause of fluctuations, FIG. 6(b) provides some indication that variations in film thickness may be important. It is worth noting that, as a percentage, the deviation in the measured coating thickness from strictly inverse dependence on length is somewhat larger than the deviation in the measured group delay from linear. We speculate that thermal diffusion along the length of the fiber tends to "smooth out" slight non-uniformities in the distribution of heating power that occur on short length scales, and that this effect reduces the impact of small variations in thicknesses or other film characteristics.

Figure 9:
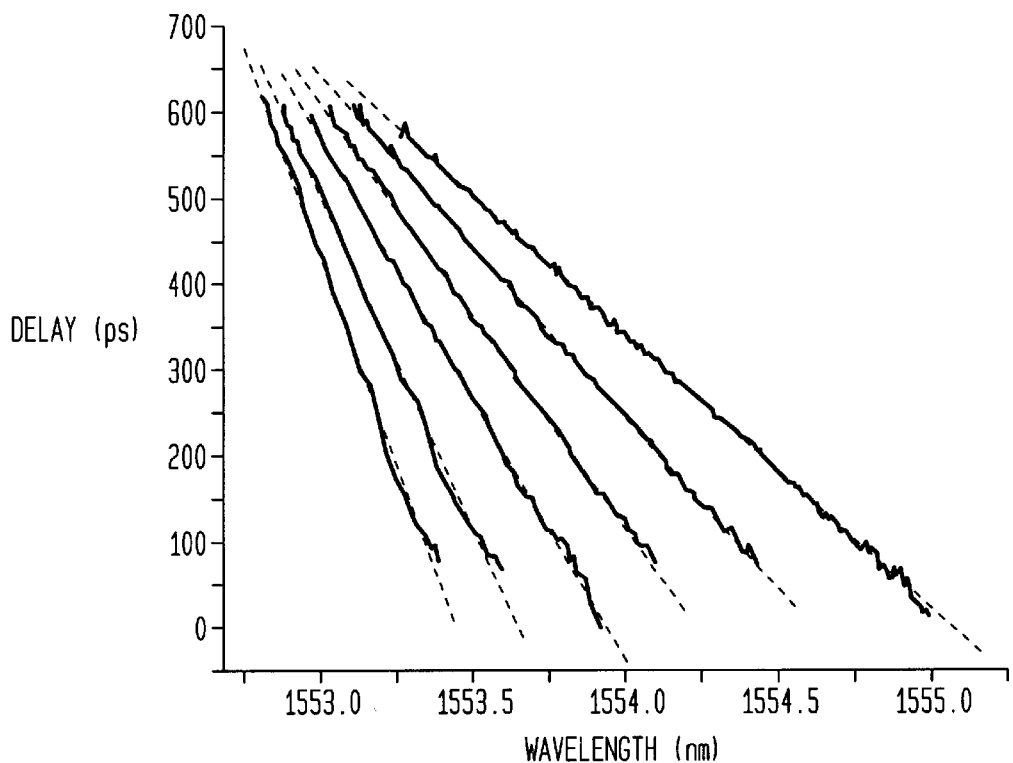

FIG. 9 shows the measured group delay response of the grating device for different values of applied voltage: (i) 0.53V, (ii) 0.611V, (iii) 0.72V, (iv) 0.82V, (v) 0.94 and (vi) 1.1. The figure illustrates the tunability of the dispersion. Note that the "noise" in the measured group delay slightly increases for the larger dispersion values. Even for the largest dispersion value obtained, the deviation from linearity is only 20 ps.

Figure 10:
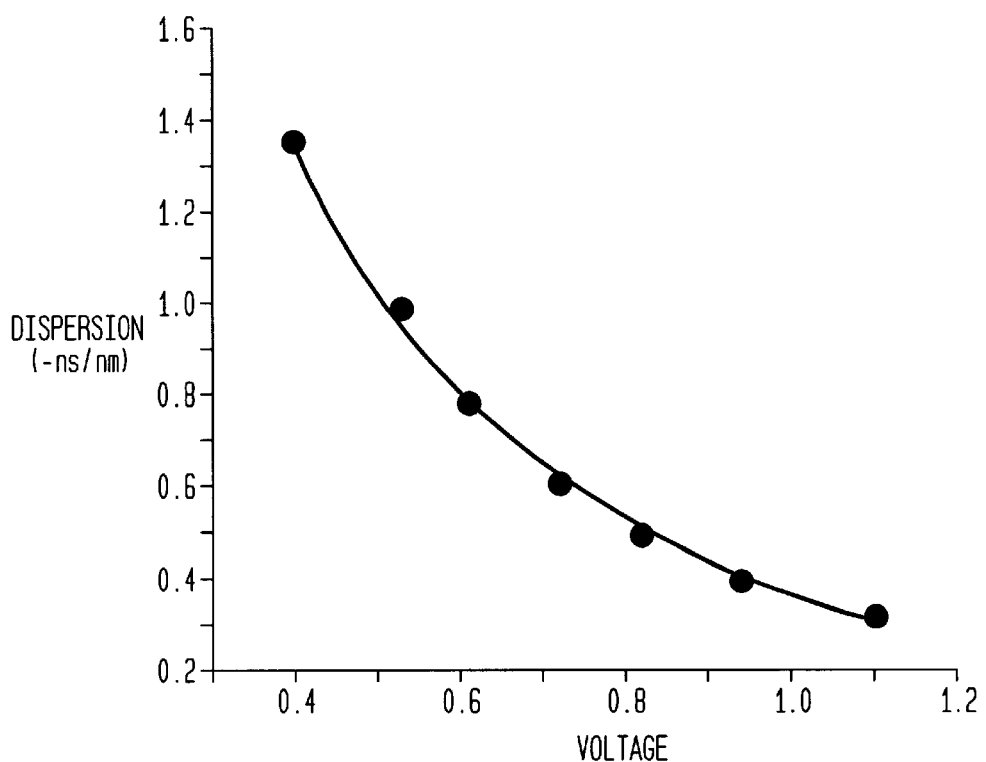

FIG. 10 shows the measured group velocity dispersion as a function of applied voltage. The solid line is a theoretical fit to the data assuming that the dispersion scales with the inverse of the square of the applied voltage. The maximum dispersion measured was approximately D=−1350 ps/nm, corresponding to an applied voltage of 0.4V, and a corresponding electrical power of 0.4 W. Increasing the applied voltage has the effect of increasing the temperature gradient and thus the bandwidth of the grating, which reduces the dispersion of the grating.

The maximum applied voltage in this experiment was approximately 1.1V (approximately 1 W electrical power), which corresponds to a peak temperature close to 200 C. We note that this is well below the level at which reliability can become an issue. In particular, operating at high temperatures can have many practical implications, such as requiring higher initial index changes to offset the annealing, which is required to ensure the stability of the device.

This work demonstrates a design for a fiber Bragg grating device that uses distributed on-fiber resistive heaters to achieve desired temperature distributions in the fiber and thus dispersion. The devices have attractive features that include power efficient operation, compact size, simple fabrication, and controllable optical properties. We demonstrated experimentally continuous tuning of the dispersion from −300 ps/nm to −1350 ps/nm, with an average deviation from linearity of approximately 10 ps. Previous research has shown that for optimum operation of a dispersion compensating grating, the average deviation from linearity in the measured dispersion, needs to be substantially less than the bit period, preferably of the order of 10%. The device presented here, with a measured group delay deviation from linearity of 10 ps, is thus well suited to operation in a 10 Gbit/s lightwave systems (bit period of approximately 100 ps). For operation at 40 Gbit/s, improvements in the design of the grating and metal coating are necessary in order to reduce the ripple even further. We note that the maximum achievable dispersion in the grating device is limited only by the absolute length of the grating and thus could be increased dramatically by using long fiber Bragg gratings.

As mentioned previously, we speculate that limited axial thermal diffusion, which tends to "smooth out" the effects of slight variations in heating power that arise from small unwanted changes in coating thickness or other imperfections that occur over short length scales (~1 mm), tends to improve the linearity of the group delay.

III. Data Integrity Monitors

FIG. 11 illustrates an exemplary data integrity monitor 20 useful in the embodiment of FIG. 2 comprising an optical filter 120, an optical-to-electrical converter (O-E converter) 121 and an RF spectrum processor 122. A data processor 123 is provided for calculating the feedback control signal to the compensator. The filter 120 can be a channel filter, and the O-E converter can be a photodiode. In operation, the filter selects a spectral region to be analyzed. The O-E converter 121 converts the filtered optical signal into a corresponding electrical signal. Spectrum processor 122 determines the RF spectrum of the O-E converted signal, and the data processor 123 analyzes the spectrum and calculates a generates a feedback signal for optimizing the system. A simple scheme for spectrum optimization involves minimizing the low frequency components. A description of how to generate such an optimizing feedback signal can be found in F. Heismann et al., "Automatic Compensation of First Order Polarization Mode Dispersion in a 10 Gb/s Transmission System", *Proceedings ECOC*, '98, pp. 529–530 (1998).

The advantage of this particular monitor is that it does not require a receiver or calculation of the error rate of the received data. The feedback control signal can be generated without extracting the electrical data and clock of the optical signal. An optional or supplementary feature is to provide a remotely located dispersion compensator 30' which can be remotely controlled based on the feedback signal.

FIG. 12 shows an alternative embodiment of a monitor 20 using forward error detection. Here feedback signal generation can be built into a receiver terminal. The monitor comprises an optical filter 120, an O-E converter 121, a data-clock recovery circuit 130, and an error detection circuit 131, all of which are typically found in a receiver. It further comprises a data processor 132 for calculating the error-rate and generating an optimizing feedback control signal based thereon. The feedback control signal is to optimize data integrity through the system, i.e. to minimize errors.

In operation, the optical data of each wavelength channels carry overhead bits for a forward error correction algorithm. Typically this algorithm will be implemented as a Reed Solomon forward error correction code (see for example BA G. Lee, M. Kang and J. Lee, "Broadband telecommunication technology", Artic House, 1993 on forward error correction algorithms including the Reed Solomon code and their implementation). The optical wavelength channels pass through the variable dispersion compensator, which can be co-located with the receiver terminal, or placed remotely from the terminal. In the latter case, the control signal to the dispersion compensator is transmitted to the remote dispersion compensator 30' via a management signaling system. At the terminal, the signal is filtered optically to select a specific wavelength channel. The data are converted into the electrical domain in the O-E converter and the clock and data are extracted from the received wavelength channel. The recovered data are passed to the error correction circuit, where, based on the implementation of the error correction algorithm, data are corrected and passed to the output of the receiver terminal. The error correction circuit also provides information on the number of bits that were corrected in a certain time period. Based on this number, the bit-error rate—before error correction—can be calculated corresponding to the present value of the control signal applied to the dispersion compensator. By comparing the present error-rate and control signal with the error-rate and control signal corresponding to a previous setting of the control signal, the ratio $D_{error\ rate}/D_{Control\ signal}$ can be derived. This ratio tells how much the control signal should be changed to minimize the bit error rate, and in what direction. The calculated control signal is applied to the dispersion compensator, and a new bit error rate is measured and used to calculate a new control signal.

Figure 13:
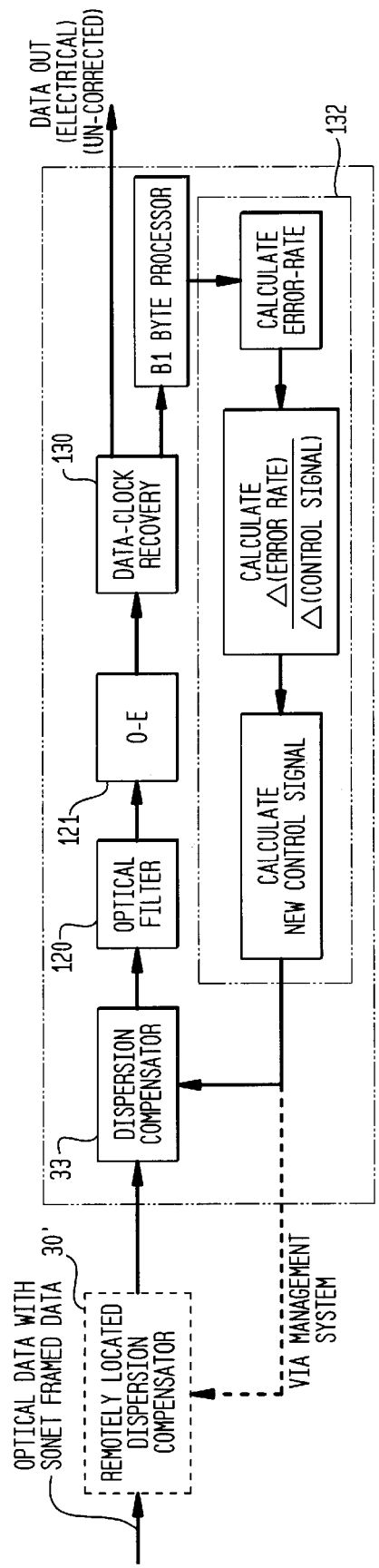

FIG. 13 shows another embodiment of a monitor 20 which does not require error correction algorithms but rather uses the error detection capability of the framing format used to carry the data. This monitor differs from that of FIG. 12 primarily in the programming of the data processor 132. One example of such framing format is SONET which provide error detection (but not correction) via the B octets in the SONET frame. Thus, the error rate can be calculated by accessing and processing the B octets in the SONET frame. The implementation of the feedback signal generation is similar to the implementation described for FIG. 12. This implementation of the error rate detection and feedback signal generation works for any signaling protocol where the data are packaged in frames and the frames contains error detection (or even error correction) information. Examples of such transmission protocols include ATM where the error rate can be obtained by processing the HEC byte and FDDI, where the presence of transmission errors is indicated in the frame status section of the FDDI frame. Thus the error detection circuit can detect errors in an ATM format or in an FDDI format.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed is:

1. An improved optical fiber communication system comprising an optical transmitter for providing at least one optical signal channel, an optical fiber transmission path, and an optical receiver, said system subject to variation in the optimum path dispersion as a function of optical signal power, the improvement comprising:

at least one automatic dispersion compensation module coupled to said transmission path, said module comprising an adjustable dispersion compensating element, a data integrity monitor for monitoring comprising an error detection circuit for detecting errors in the data transmitted on the system, and a feedback circuit from said monitor to the adjustable dispersion compensating element for adjusting the adjustable dispersion compensating element to optimize data integrity through the system.

2. The system of claim 1 wherein said adjustable dispersion compensating element comprises a Bragg grating with adjustable chirp.

3. The system of claim 1 wherein said adjustable dispersion compensating element comprises a Bragg grating with thermally adjustable chirp.

4. The system of claim 1 wherein said adjustable dispersion compensating element comprises a Bragg grating with magnetically adjustable chirp.

5. The system of claim 1 wherein said data integrity monitor comprises, a data processor for calculating an optimizing feedback signal based on said errors.

6. The system of claim 1 wherein said error detection circuit detects errors in the framing format used to carry data.

7. The system of claim 6 wherein said error detection circuit detects errors in a SONET format.

8. The system of claim 6 wherein said error detection circuit detects errors in an ATM format.

9. The system of claim 6 wherein said error detection circuit detects errors in an FDDI format.

10. The system of claim 1 wherein said error detection circuit comprises a forward error correction circuit.

11. The system of claim 10 wherein said error correction circuit utilizes a Reed Solomon forward error correction algorithm.

12. The system of claim 1 wherein said optical transmitter comprises a multiwavelength optical transmitter for providing a plurality of wavelength-distinct optical signals channels, and said receiver comprises a multiwavelength optical receiver.

* * * * *